United States Patent Office 3,529,192
Patented Sept. 15, 1970

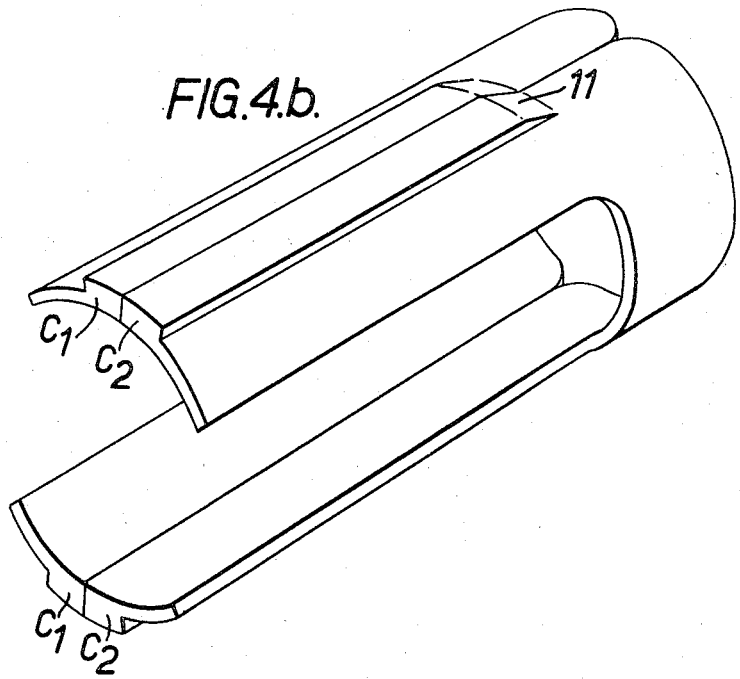
FIG.4.b.
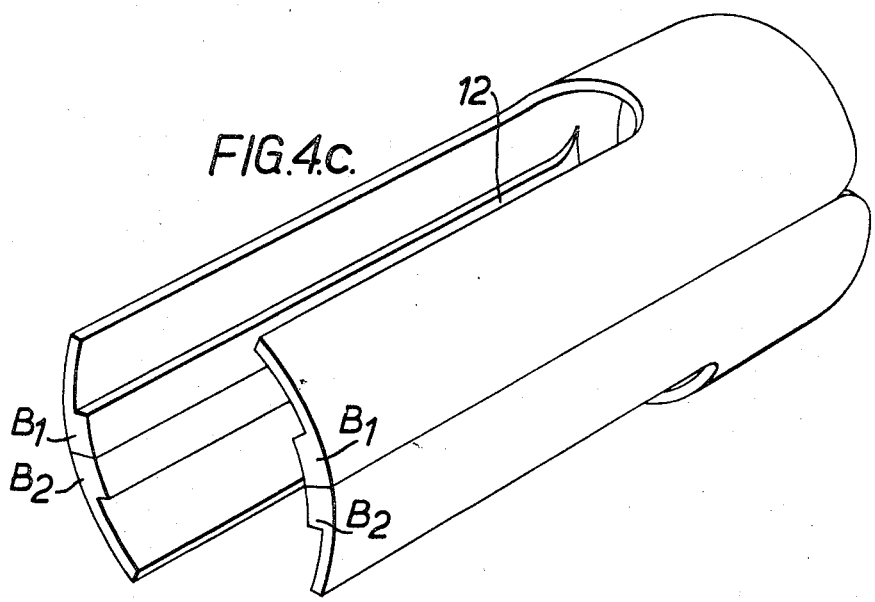
FIG.4.c.

3,529,192
DYNAMO-ELECTRIC MACHINES HAVING SLOTLESS CONCENTRICALLY WOUND ARMATURE WINDINGS
Evan John Davies, Sutton Coldfield, Birmingham, England, assignor to National Research Development Corporation, London, England, a British corporation
Filed Dec. 3, 1968, Ser. No. 780,687
Claims priority, application Great Britain, Dec. 5, 1967, 55,329/67
Int. Cl. H02k 3/00, 3/46
U.S. Cl. 310—179                           5 Claims

ABSTRACT OF THE DISCLOSURE

An alternator has a slotless three-phase armature winding which is concentrically wound. The winding may be short pitched by arranging for the different phase bands to overlap and the thickness of the windings in the end turns is reduced by accommodating the conductors of each phase winding within a limited depth. One-phase winding is split in the end region to occupy two different radial levels and the remaining phase windings are sandwiched between the levels.

---

Figure 1:
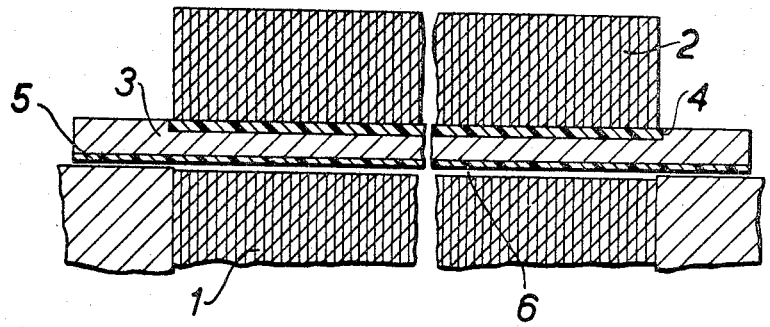

This invention relates to dynamo-electric machines and has particular but not exclusive application in large alternators.

Dynamo-electric machines commonly carry their armature windings in slots positioned around the periphery of the stator or rotor adjacent the air-gap. In large alternators the magnetic flux density in the teeth between the slots is extremely high and this is one limit to the magnitude of the flux in the machine as well as resulting in high iron loss. The effect of leakage flux across the slot is to produce considerable forces on the conductors in a radial direction for which they require to be wedged, while leakage of the main flux along a slot in a radial direction causes supplementary losses and peripheral forces. Furthermore, a considerable proportion of the cross-section of a slot is required for insulating the copper from the iron, so that slot utilisation is rather low.

To prevent the occurrence of losses associated with slots and teeth it has been proposed to have a slotless armature and locate the armature winding in the air gap between the rotor and the stator.

This construction eliminates the need for slots and teeth and is particularly suitable for large alternators in which the magnitude of the air gap is of the order of 100 mm. or more, which allows ample room for the armature winding and necessary insulation. The armature winding may be secured to the inner periphery of the stator, or alternatively the invention may be utilised in a machine of inverted construction in which the armature winding is secured to the rotor.

It is an object of the invention to provide a form of air-gap armature winding which takes advantage of the freedom from slots.

Accordingly the present invention comprises a dynamo-electric machine having a slotless armature and a multi-phase concentrically wound armature winding in the air-gap.

In machines with windings in slots, it has hitherto not been common to utilise concentric windings due to the fact that in the end-turn regions a considerable thickness of winding in a radial direction is required to accommodate all the end-turns of the different phases, nor has it been feasible to short pitch concentric windings. However, due to the freedom from slots it is possible to reduce the radial thickness of the end-turn region and hence take advantage of the concentric type of winding, namely that the distance in the axial direction of the end-turns is much reduced over conventional double layer windings.

In a three-phase armature winding this reduction in radial thickness is provided by arranging for one of the phase windings to be split into two parts each occupying different levels in the end region spaced apart from each other in a radial direction and remaining phase windings are arranged to occupy individual levels sandwiched between the spaced-apart levels of the said one phase winding. This arrangement allows the diameter of the end turns to be made substantially equal to the diameter of the winding in the active region so that a prefabricated armature winding can be inserted right through the stator bore.

The freedom from slots may also be used with advantage to provide a concentric chorded or short-pitched winding and this may be achieved by arranging for the said one phase winding to occupy two levels in the active region of the armature displaced from each other both circumferentially and radially. The remaining phase windings can then each occupy volumes having T-shaped cross-sections in the active region of the armature inverted with respect to each other and inter-fitting with each other between the two parts of the said one phase winding.

It will be appreciated that with all the above arrangements it is necessary to provide phase-to-ground insulation only around each complete phase winding and not around each conductor as has been hitherto where slots are used.

Figure 2A:
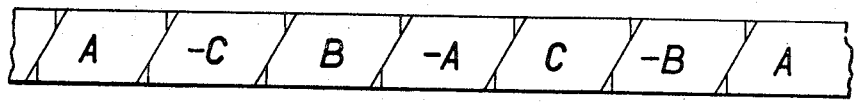
Figure 2B:
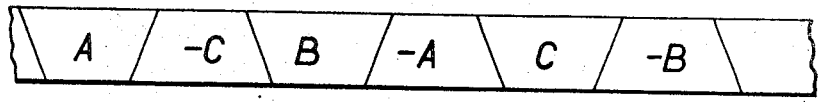
Figure 2C:
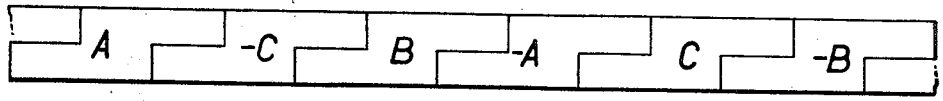
Figure 2D:
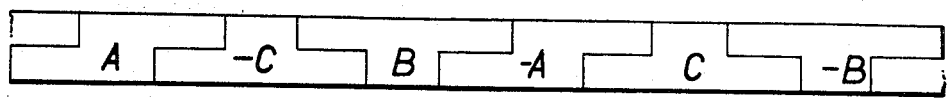
Figure 3:
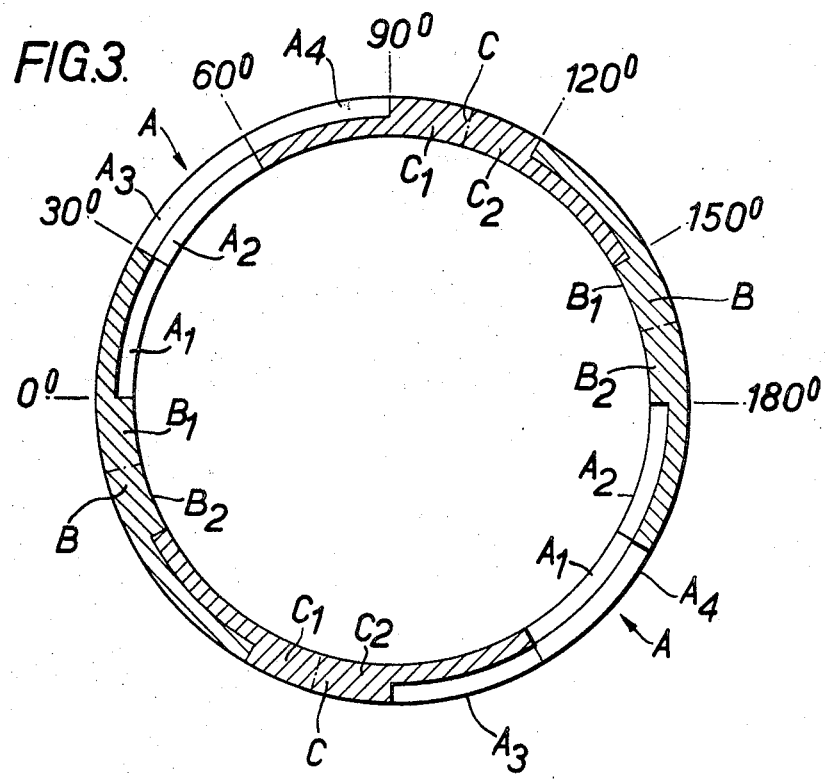
Figure 4A:
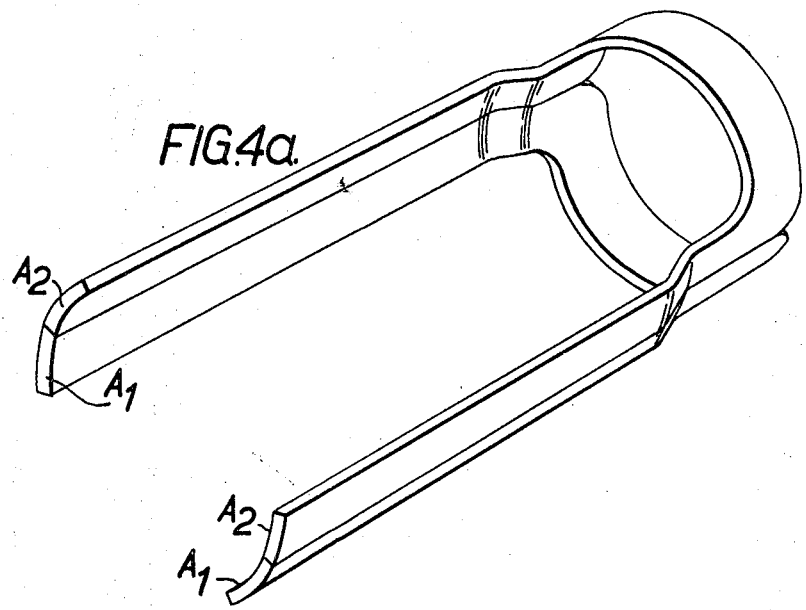
Figure 4D:
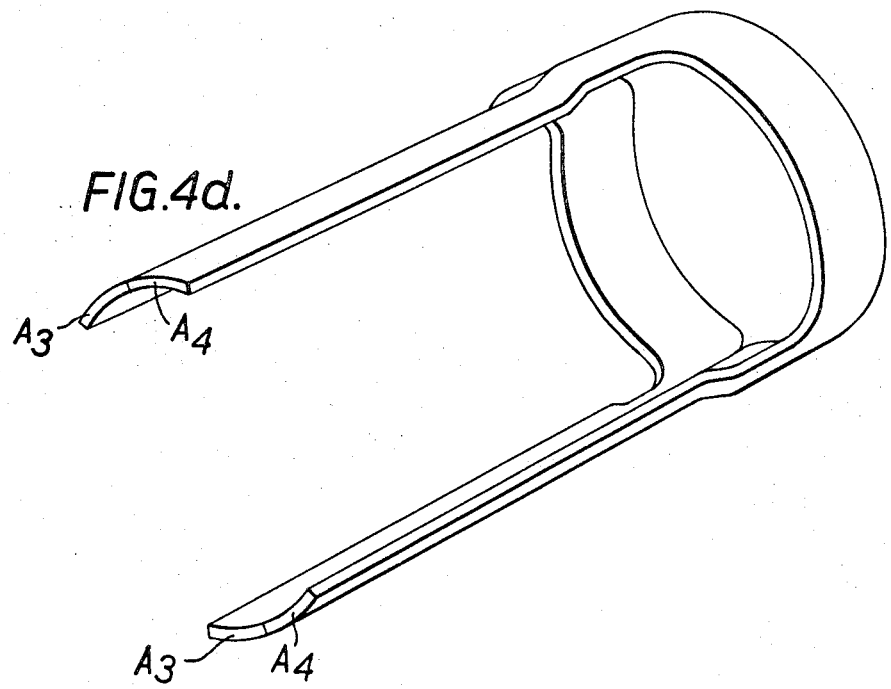
Figure 5A:
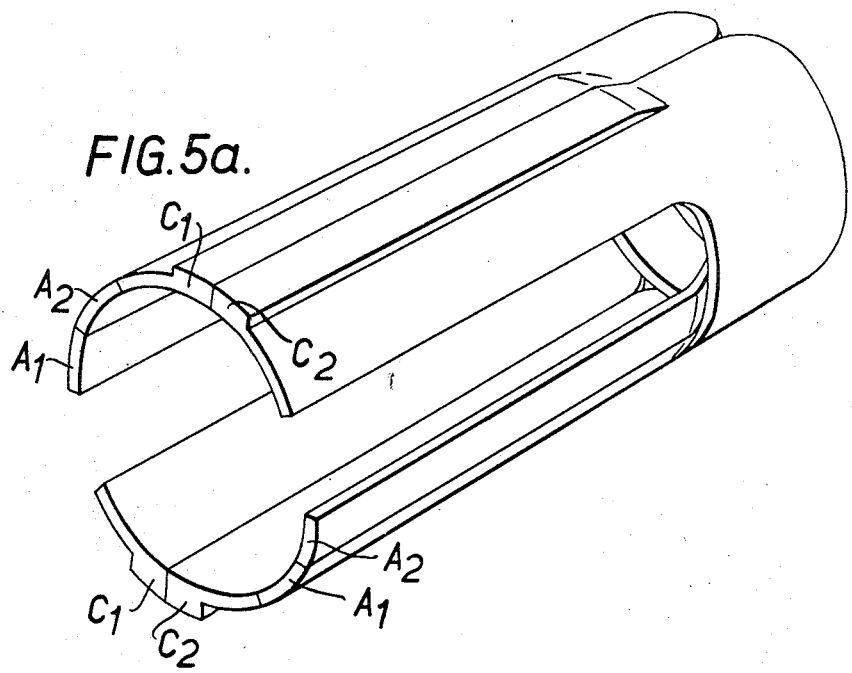
Figure 5B:
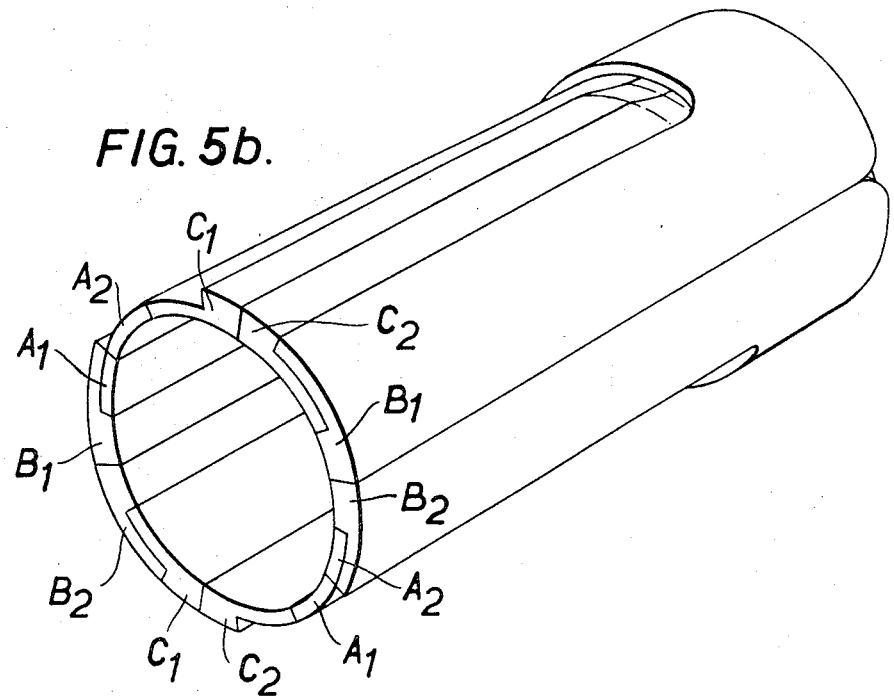
Figure 5C:
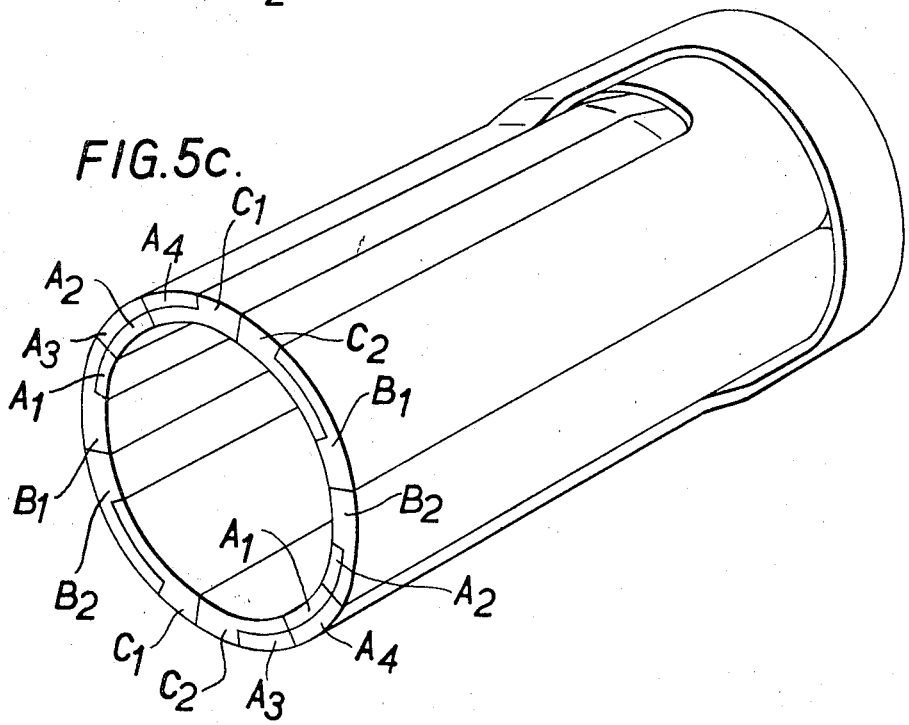

In order that the invention may be more fully understood, reference will now be made to the accompanying drawings in which:

FIG. 1 illustrates diagrammatically in axial section a machine embodying the invention, FIGS. 2a, 2b, 2c and 2d illustrate various arrangements of winding that can be used, FIG. 3 is a cross-section of all the windings in a radial plane, FIG. 4a to 4d inclusive illustrate the phase windings or parts thereof separately, and FIGS. 5a, 5b and 5c show successive stages in the building up of the winding illustrated in FIG. 3.

Referring now to FIG. 1 there is shown therein a dynamo-electric machine comprising a rotor 1 which may be of any convenient form and a stator 2 comprising laminations of magnetic material, but which is not provided with winding slots around its inner periphery. A winding 3 of copper or other suitable conductive material such as aluminum is secured to the inner periphery of stator 2, a layer of insulation 4 being provided to insulate the conductive material from the stator, which will be at ground potential. A relatively thin insulating tube 5 is secured to the inner periphery of the winding and an air-gap 6 to allow adequate mechanical clearance and magnetic stability exists between the outer surface of the rotor 1 and the insulating tube 5. Tube 5 may be continued beyond the windings and be attached to the stator frame to separate the stator and rotor regions. These can then be held at different pressures.

It will be appreciated that the winding 3 needs to be secured to withstand the entire torque of the machine and although in a large alternator for example, this torque will have a high value, nevertheless the force per unit area will not be large and the shear stress set up will be well within the capabilities of known bonding materials. The inner surface of the stator may be provided with keyways to enable the torque of the machine to be resisted. Winding 3 will normally be a multiphase winding and the conductors will need to be bonded together sufficiently strongly, for example with reinforced resins to withstand the interphase forces.

It can be shown that the magnetic gap required between rotor 1 and stator 2 in a large machine allows plenty of room in which to position winding 3 and necessary insulation whilst still leaving a sufficient air-gap 6. Furthermore the main insulation is required only between each phase winding, and not around each small group of conductors, as in a slotted winding.

The winding 3 is a concentric winding. FIG. 2a illustrates one example of such a winding and shows the phase bands of a three-phase winding having phases A, B and C, each having a 60° spread. The winding has less than full pitch and each phase band utilises a cross-section of generally parallelogram shape. For convenience the corners of the parallelogram can be truncated as shown by the dotted lines. As an alternative to the winding in FIG. 2a, the winding in FIG. 2b can be used in which the phase bands have trapezium shapes. These can also be truncated if desired. Although the windings shown in FIGS. 2a and 2b are single layer windings wound concentrically, nevertheless they have the advantages of chording or short pitch.

The boundaries between the different phase bands shown diagrammatically in FIG. 2a and FIG. 2b can in practice be replaced by stepwise boundary lines as shown in FIG. 2c. Another particularly advantageous arrangement is shown in FIG. 2d. Here it will be noticed that the phase band of phase A corresponds to the stepped shape shown in FIG. 2c while the phase bands of phases B and C are T-shaped and approximate to the trapezium shapes shown in FIG. 2b. Electrically both shapes are the equivalent of each other. It will be seen that the various phase bands interfit with each other while the phase bands of each phase in both directions (i.e. A and —A, B and —B C and —C) have identical shapes so that no difficult problems arise in crossing over of the conductors in the end regions. The winding of FIG. 2d has a ⅚ pitch, but the pitch can be varied by changing the thickness of the stem-part of the T.

Hitherto if the windings in the end regions were to be concentric the total thickness of the end region windings in a radial direction would have needed to be three times the thickness of each pase winding in the active region. As described and illustrated below the arrangement of phase bands of FIG. 2d can have the end regions arranged so as to considerably reduce this thickness and thus make the use of concentric end windings a practicable proposition.

The arrangement of the phase bands which are shown in opened out diagrammatic view in FIG. 2d is shown more clearly in FIG. 3 as a cross-section in a radial plane through the active region of the armature winding. As shown therein the phase winding of phase A is divided into two parts and each on a level of different mean radius and the part winding on each level is itself divided into two portions. Thus the part winding at the inner level comprises portions A1 and A2 and the part winding at the outer level comprises portions A3 and A4. The other phase windings of phases B and C which are T-shaped are each split into two portions B1, B2 and C1, C2 by radial lines. The parts A1 and A2 of phase winding A are shaped in a manner shown more clearly in FIG. 4a which illustrates these parts only of phase winding A. It will be seen that the two parts A1 and A2 are bent in respective opposite directions in the end regions and return in band —A opposite band A thus forming a concentric winding. The phase winding C comprising two portions C1 and C2 is shown separately in FIG. 4b portions. These portions each include both half of the head of the T and half of the stem thereof. In the end region the whole of the phase winding C lies within a volume defined by the radial thickness of the head part only of the T and the stem part of the T is bent either in the end region or immediately before so that it lies in the same plane as the remainder of the winding. This change of level of the stem part of the T is shown more clearly in 11 in FIG. 4b.

The phase winding B is also T-shaped, but is inverted with respect to the cross-section occupied by the phase winding C. Phase winding B is also split by a central radial line into two portions B1 and B2 each of which is bent in an opposite direction in the end region as shown in FIG. 4c to form a concentric winding. In phase winding B the stem-parts of the T are bent outwardly at 12 so that in the end region they lie in the same plane as the head part of the T.

Finally, the remaining part of phase winding A comprising the portions A3 and A4 are constructed in a similar manner to the part of the phase winding constituted by A1 and A2 except that the end turns of parts A3 and A4 lie at levels which are spaced apart radially from the levels occupied by the part end-turns A1 and A2.

Between the two levels occupied on the one hand by the windings parts A1 and A2 and on the other hand by winding parts A3 and A4, there are sandwiched the end turns of the phase windings B and C. This inter-fitting of the end turns is shown in successive step-by-step build-up in FIGS. 5a, 5b and 5c consecutively. Thus FIG. 5a shows the winding parts A1 and A2 together with the whole of phase winding C and it will be seen that in the end turn region parts A1 and A2 fit inside the volume occupied by the phase winding C. FIG. 5b shows phase winding B added to the windings already shown in FIG. 5a. Phase winding B in the turn region is positioned on a level outside the level occupied by phase winding C. Finally in FIG. 5c there is shown a view of all the three phase windings completely and its cross-section in the active region is identical to the cross-section view shown in FIG. 3. It will be seen that in FIG. 5c, where the winding parts A3 and A4 have been added, these lie in the end turn region at a level outside that occupied by phase winding B.

It will thus be seen that winding parts A1 and A2, the whole of phase winding C, the whole of phase winding B, and the winding parts A3 and A4 each occupy a different radial level in the end turns and each of these levels has a thickness equal to half the thickness of the winding in the active region. Thus the total thickness of winding in the end-turn region is only twice the thickness of the active winding instead of three times as in a conventionally designed concentric winding.

As an alternative to the arrangement of end-turns described above any other suitable arrangement of end-turns can be utilised and it may be desirable, with whatever arrangement of end turns is used, to prefabricate the bore portion and one set of end windings and insert it into the machine and then form the other set of end windings on site. Alternatively, the windings may be completely prefabricated in such a way that one completed end winding and the active conductors pass through the stator bore. Since only one end winding passes through the stator bore, the other end winding can be adapted to receive cooling pipes and the like. This would allow prefabricated stator windings, both for initial manufacture and for subsequent repair and would allow replacement windings to be kept in reserve. Each phase-band, or part thereof, can be made separately and be fastened to the inner surface of the stator.

If cooling by gas or liquid is required this can readily be incorporated for example by including small bore tubes with the windings or else by providing arrays of cooling tubes at the inner and outer surfaces of the winding or by moulding cooling tubes into the phase bands. Cooling ducts may also be incorporated between the stator 2 and the ground insulation 4.

As an alternative to the overlapping phase-bands illustrated in the windings described above, another means of achieving short pitching in a single layer concentric winding is to skew the winding in the active region of the conductors.

It can be shown that since stator teeth are no longer required the outside diameter of the stator can be considerably reduced and since the core will be carrying magnetic flux the directions of which are substantially peripheral, it should be possible to use grain-oriented steel advantageously.

I claim:

1. A dynamo-electric machine having a slotless armature and a three-phase concentrically wound armature winding in the air gap wherein one of the phase windings is split into two parts, each occupying different levels in the end region spaced apart from each other in a radial direction and the remaining phase-winding each occupy individual levels sandwiched between the spaced apart levels of the said one phase winding.

2. The machine as claimed in claim 1 in which windings are chorded.

3. The machine as claimed in claim 2 in which the two parts of the said one phase winding occupy two levels in the active region of the armature displaced from each other both circumferentially and radially.

4. The machine as claimed in claim 3 in which the remaining phase-windings each occupy volumes having T-shaped cross-sections in the active region of the armature inverted with respect to each other and inter-fitting with each other between the two parts of the said one phase winding.

5. The machine as claimed in claim 1 in which phase to phase insulation is provided around each phase winding only.

References Cited

UNITED STATES PATENTS

| | | | |
|---|---|---|---|
| 396,941 | 1/1889 | Knowles | 310—195 |
| 525,697 | 9/1894 | Eickemeyer | 310—195 |
| 531,623 | 1/1895 | Decker | 310—195 |
| 3,082,337 | 3/1963 | Horsley | 310—179 |
| 3,097,319 | 7/1963 | Henry-Baudot | 310—179 |

WARREN E. RAY, Primary Examiner

U.S. Cl. X.R.

310—192, 195, 202